(12) United States Patent
Thomas

(10) Patent No.: US 6,779,619 B2
(45) Date of Patent: Aug. 24, 2004

(54) ELECTROMECHANICAL PARK PAWL FOR ELECTRIC VEHICLE TRANSMISSIONS

(75) Inventor: James A. Thomas, Spencerville, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 43 days.

(21) Appl. No.: 10/217,180

(22) Filed: Aug. 12, 2002

(65) Prior Publication Data
US 2004/0026139 A1 Feb. 12, 2004

(51) Int. Cl.[7] .................................................. B60K 6/02
(52) U.S. Cl. ..................... 180/65.2; 180/65.6; 180/344; 192/69.82; 192/84.92; 192/90
(58) Field of Search ............................... 180/65.1, 65.2, 180/65.3, 65.4, 65.6, 65.7, 344, 370; 192/219.4, 219.5, 218, 219, 220, 220.1, 220.2, 222, 114 R, 69.82, 84.92, 90

(56) References Cited

U.S. PATENT DOCUMENTS

| | | | | |
|---|---|---|---|---|
| 5,943,918 A | * | 8/1999 | Reed et al. ..................... 74/661 |
| 6,123,183 A | * | 9/2000 | Ito et al. ....................... 192/220 |
| 6,186,253 B1 | | 2/2001 | Barnhart et al. |
| 6,286,633 B1 | * | 9/2001 | Kim ............................. 188/69 |
| 6,371,878 B1 | * | 4/2002 | Bowen .......................... 475/5 |
| 6,446,772 B1 | * | 9/2002 | Inose et al. .................... 192/35 |
| 6,471,027 B1 | * | 10/2002 | Gierer et al. ............. 192/219.5 |
| 6,551,209 B2 | * | 4/2003 | Cheadle et al. ............. 475/150 |
| 6,569,054 B2 | * | 5/2003 | Kato .............................. 477/5 |

* cited by examiner

*Primary Examiner*—Bryan Fischmann
*Assistant Examiner*—Brian Swenson
(74) *Attorney, Agent, or Firm*—Jeffrey P. Calfa; Dennis Kelly Sullivan; Susan L. Lukasik

(57) ABSTRACT

A parking pawl is implemented on a series type, hybrid electric vehicle by providing a transmission having a moveable locking plate. The locking plate is used to selectively engage and disengage from one of the power transfer gears of the transmission. While the locking plate is linearly moveable between engaged and disengaged position, it is locked against rotation and prevents rotation of the power transfer gear when engaged thereto. An electromagnet is used to pull the locking plate from an engaged position to a retracted, disengaged position. A compression spring biases the plate toward the engaged position with the rotating gear. The locking plate can be held in the retracted position by moveable locking pins to avoid any need to keep the electromagnet energized.

2 Claims, 5 Drawing Sheets

ELECTROMECHANICAL PARK PAWL FOR ELECTRIC VEHICLE TRANSMISSIONS

FIELD OF THE INVENTION

The present invention relates to a hybrid electric vehicle and more particularly to a park pawl integrated with a transmission for such a vehicle.

BACKGROUND OF THE INVENTION

Series type hybrid electric vehicles have an electric generator driven by a thermal engine to supply electrical power to the vehicles' battery and electrical power distribution system, which in turn support operation of an electric drive motor. Unlike parallel type electric vehicles which have a drive line which may be driven directly by the thermal engine, series type electric vehicles are driven by only the electric drive motor. The term series refers to the path of energy from the thermal engines to the drive line and hence to a powered axle and wheels. Several advantages follow from this arrangement. For example, if the drive motor does not require power and the thermal engine is running, then all electrical power can be used to charge the battery, and run other electrical power using systems. Further, the drive motor and thermal engine may be positioned on the vehicle chassis substantially without consideration of one another.

The drive motor is connected to the driven axle through a gear reduction or transmission type device and a drive train. The transmission is based on a ring or planetary gear set comprising several rotatable elements. Park brakes have been provided in such vehicles through a mechanical, non-fluid operated mechanism in proximity to the drive train, such as illustrated in U.S. Pat. No. 6,186,253. However, park pawls as commonly found in automatic transmissions, which provide a back up to park brakes, have not readily duplicated with off the shelf motors and gear reduction devices used for transmissions in hybrid vehicles. Nor is the possibility of leaving the vehicle in gear to use the thermal engine as a brake available. What is needed is a mechanically reliable and easily implemented park pawl for electric vehicles.

SUMMARY OF THE INVENTION

According to the invention there is provided a transmission for an electric motor. The transmission comprises a housing, rotatable elements located within the housing and coupled to be driven by a drive motor, a locking plate located within the housing and coupled thereto for movement into and out of engagement with a first of the rotatable elements to prevent rotation of the rotatable elements, a plurality of slots around an outer perimeter of one face of the first rotatable element, a plurality of cooperating teeth disposed on one face of the locking plate for engaging the plurality of slots on the first rotatable element, means for preventing rotation of the locking plate, and means for urging the locking plate linearly into and out of engagement with the first rotatable element. An electromagnet is affixed to the housing behind the locking plate relative to the first rotatable element for drawing the locking plate away from the first rotatable element when energized. A spring is positioned with respect to the locking plate and electromagnet for urging the locking plate into engagement with the first rotatable element. A plurality of guide pins is affixed to the back of the locking plate, the guide pins being positioned to move into and out of openings in the electromagnet to define a linear travel for the locking plate to and from the first rotatable element while preventing rotation of the locking plate with the first rotatable element. A spring actuated catch for each guide pin is located with respect to the electromagnet for engaging its respective guide pin when the locking plate reaches a travel limit in the direction away from the first rotatable element. A solenoid is associated with each spring actuated catch for releasing the spring actuated catch from its respective guide pin.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
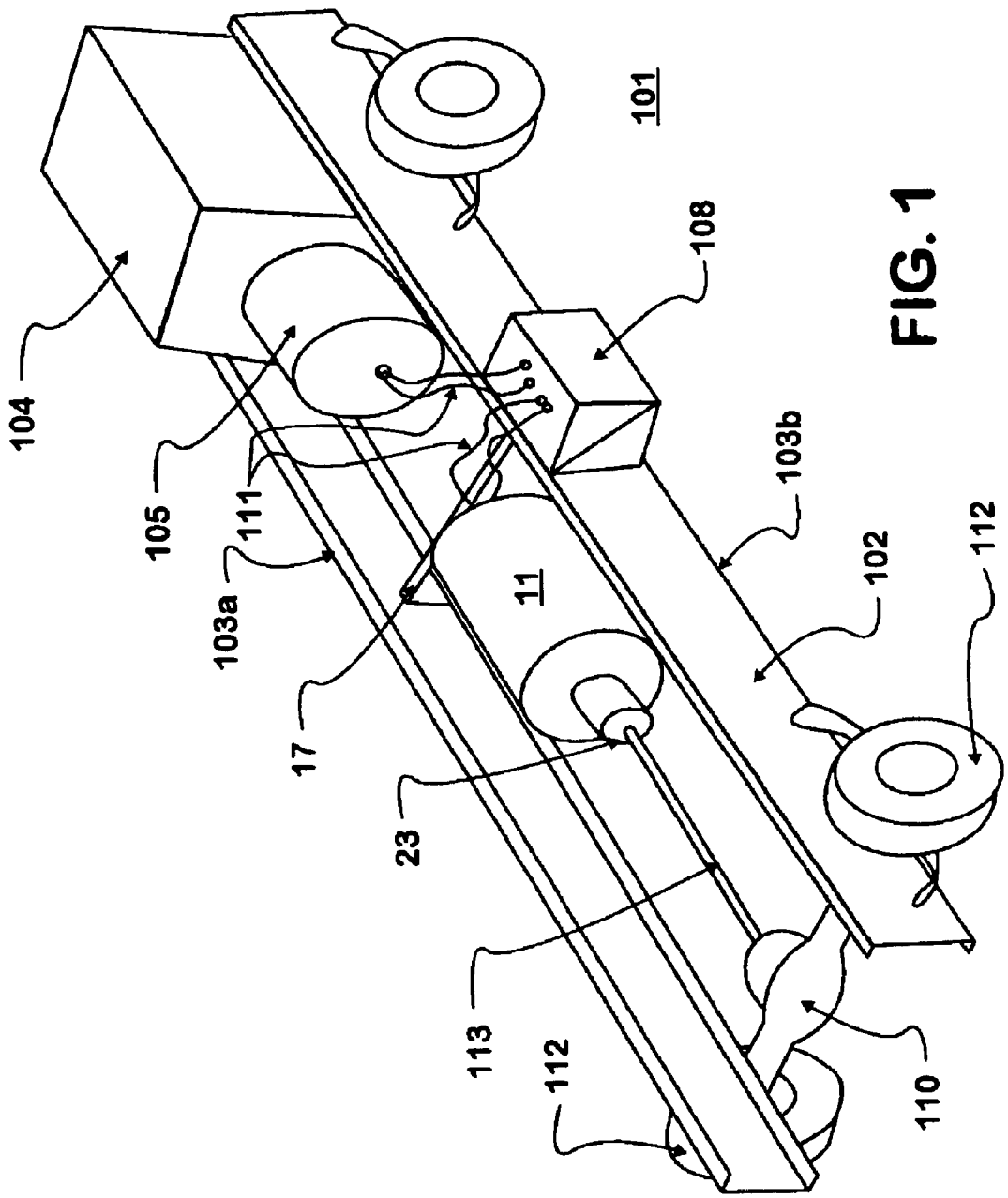
FIG. 1 is a rear quarter perspective view of a chassis of a series type hybrid electric vehicle.

Referring now to the drawings in greater detail, in FIGS. 1 to 7, there is shown a series type hybrid electric vehicle 101 with an electric drive motor 11 and transmission 24 made in accordance with this invention. Vehicle 101 has a chassis 102 with two frame rails 103a and 103b. There is a thermal engine 104, preferably a diesel, and an electric generator 105 supported from frame rails 103a and 103b, both being positioned relatively forward on the vehicle 101 between the frame rails. The generator 105 is driven by motor 104 and is electrically engaged by cables 111 to an electric control system (not shown) and batteries (not shown). The batteries are located within a battery box 108 which hangs from right frame rail 103b. The electric control system and batteries are electrically engaged by cables 111 to electric drive motor 11. The electric drive motor 11 is also supported from frame rails 103a and 103b in part from a chassis cross member 17 and other similar components (not shown).

Electric drive motor 11 is mechanically engaged to drive a drive or rear axle assembly 110 with rear wheels 112 through a step down transmission 24 and a prop or drive shaft 113. Although the invention is described and shown in conjunction with a rear drive vehicle, the invention may also be applied in a front drive vehicle where a drive axle assembly is positioned forward on vehicle 101. Indeed, the invention may be applied to non-vehicle applications where it is desirable to provide a means to positionally lock a drive line. In a vehicle application, when motor 11 is energized and rotates, drive shaft 113 couples the rotational motion to rear axle assembly 110 and rear wheels 112. Transmission 24 is a step down linkage providing the required mechanical advantage for propelling vehicle 101. As described below, transmission 24 also provides a lock feature operating as a highly secure, and reliable, park pawl.

The park pawl of the preferred embodiment is implemented by providing a transmission having a moveable locking plate 45. The locking plate 45 is used to selectively engage with and disengage from one of the power transfer gears of the transmission. While the locking plate 45 is linearly moveable between engaged and disengaged positions, it is locked against rotation and prevents rotation of the power transfer gear 47 when engaged with the gear. An electromagnet 27 is used to pull the locking plate from an engaged position to a retracted, disengaged position. A compression spring 52 biases the locking plate 45 toward the engaged position with the gear. The locking plate 45 can be held in the retracted position by moveable locking or detent pins 32A–C to avoid any need to keep the electromagnet 27 energized.

Transmission housing 23 contains the components used in the preferred embodiment of the invention to implement a transmission lock or park pawl. Three of the larger components, a ring gear 47, a locking plate 45 for engaging with the ring gear to prevent its rotation and an electromagnet 27 for controlling the position of the locking plate, are located aligned on one another within housing 23. Transmission housing 23 is formed from an outer shell 25. A flat, disk shaped electromagnet 27 is mounted inside of outer shell 25 and may be held in position with respect to the interior surface of outer shell 25 by a plurality of mounting brackets 29 extending inwardly from the inner surface of the outer shell. Mounting brackets 29 are firmly attached to both electromagnet 27 and to shell 25 thereby fixing the position of the electromagnet within transmission housing 23. Ring gear 47 is free to spin on its central axis, which is coincident with output shaft 30 within housing 23, unless engaged by locking plate 45, which can be moved to and fro between the electromagnet 27 and the ring gear. It may be assumed that ring gear 47 is driven in turn by a gear directly coupled to electric motor 11 and is a step down gear providing the mechanical advantage appropriate for propelling a vehicle.

The travel of locking plate 45 is parallel to output shaft 30. Output shaft 30 extends from ring gear 47 through an annular opening 40 through electromagnet 27 and an annular opening 60 through locking plate 45. Electromagnet 27 and locking plate 45 are perpendicular to and centered on the output shaft. Three guide pins 31A, 31B and 31C are disposed at the vertices of an equilateral triangle extending parallel to output shaft 30 from locking plate 46. Guide pine 31A, 31B and 31C extend from a major face of the locking plate toward the electromagnet 27. Guide pins 31A, 31B and 31C slide back and forth in a direction parallel to the output shaft in openings (Such as annular opening 50B) running from the back to front major surfaces of the electromagnet 27. In this way the movement of the locking plate is limited to movement in a straight line and rotation of the locking plate is prevented.

Figure 2:
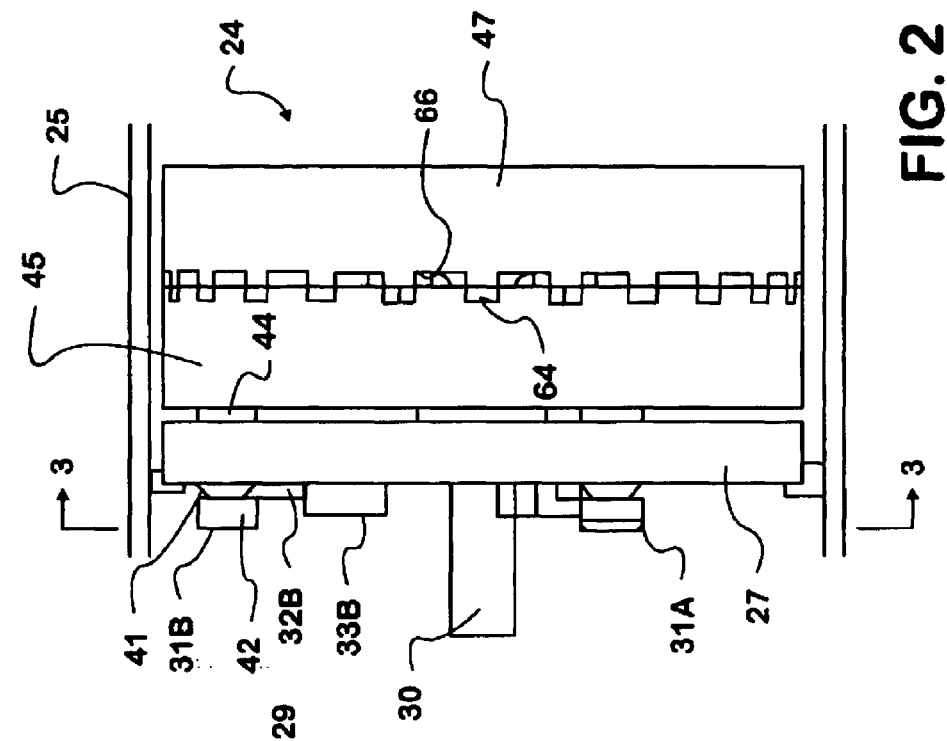
FIG. 2 is a side elevation of a traction motor transmission of the invention with the transmission housing cut open.
Figure 3:
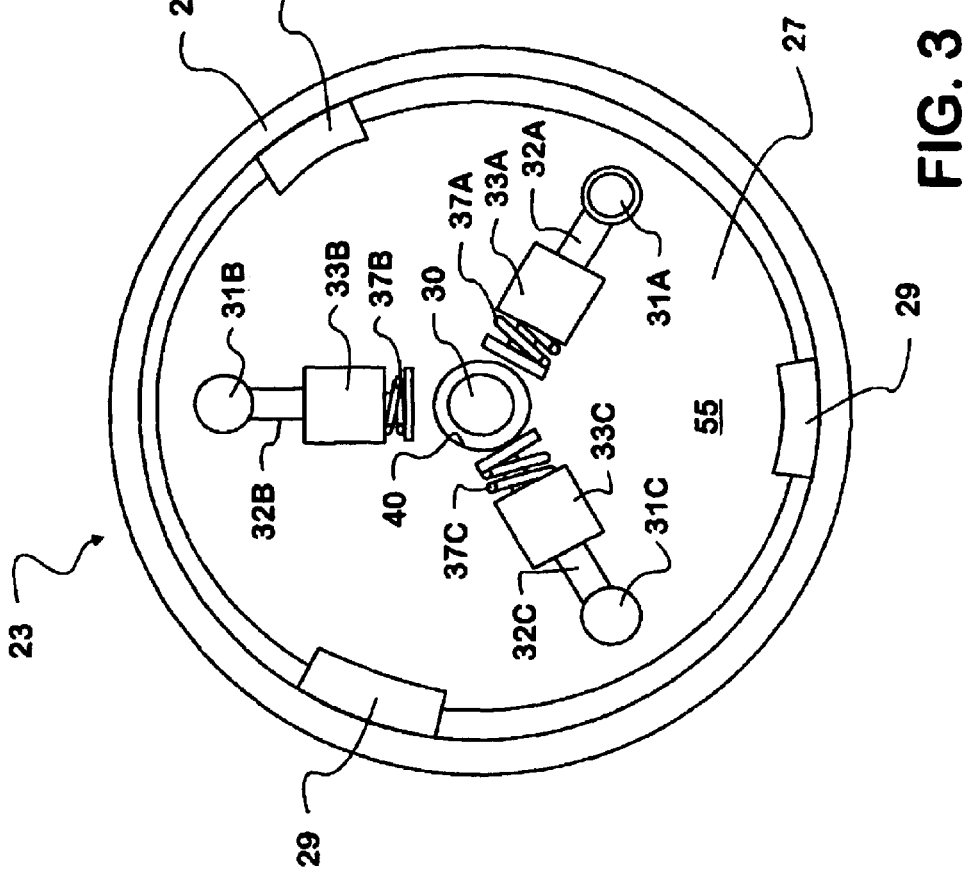
FIG. 3 is a cross sectional view of a traction motor transmission taken perpendicular to an output shaft along line 3—3 in FIG. 2.
Figure 5:
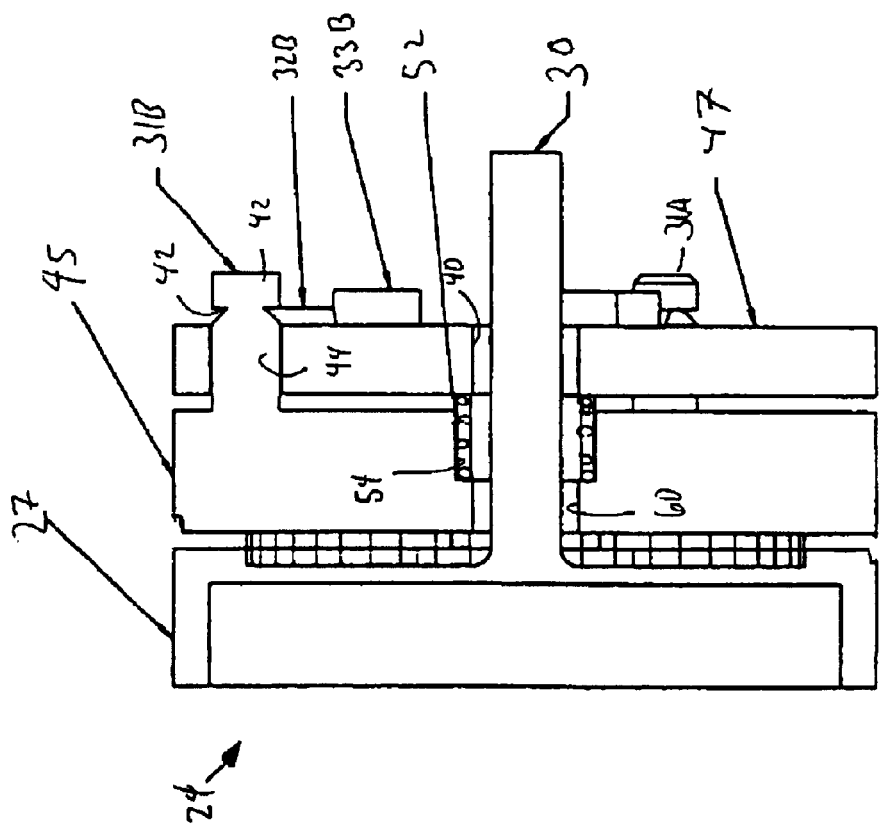
FIG. 5 is a cross sectional view of the transmission taken along line 5—5 in FIG. 4.
Figure 4:
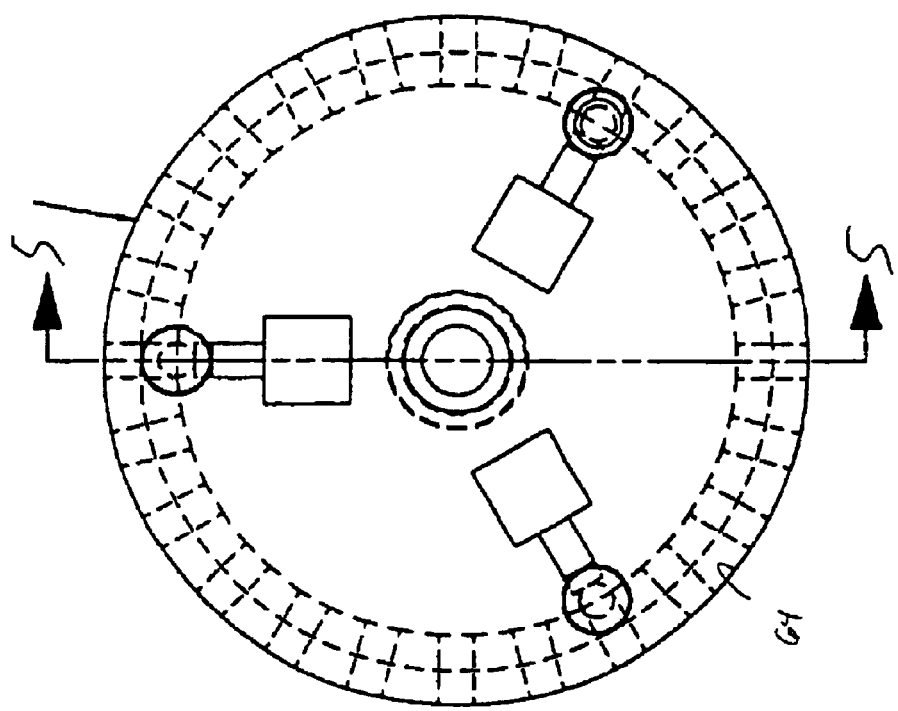
FIG. 4 is a further sectional view of the transmission of FIGS. 2 and 3.
Figure 6:
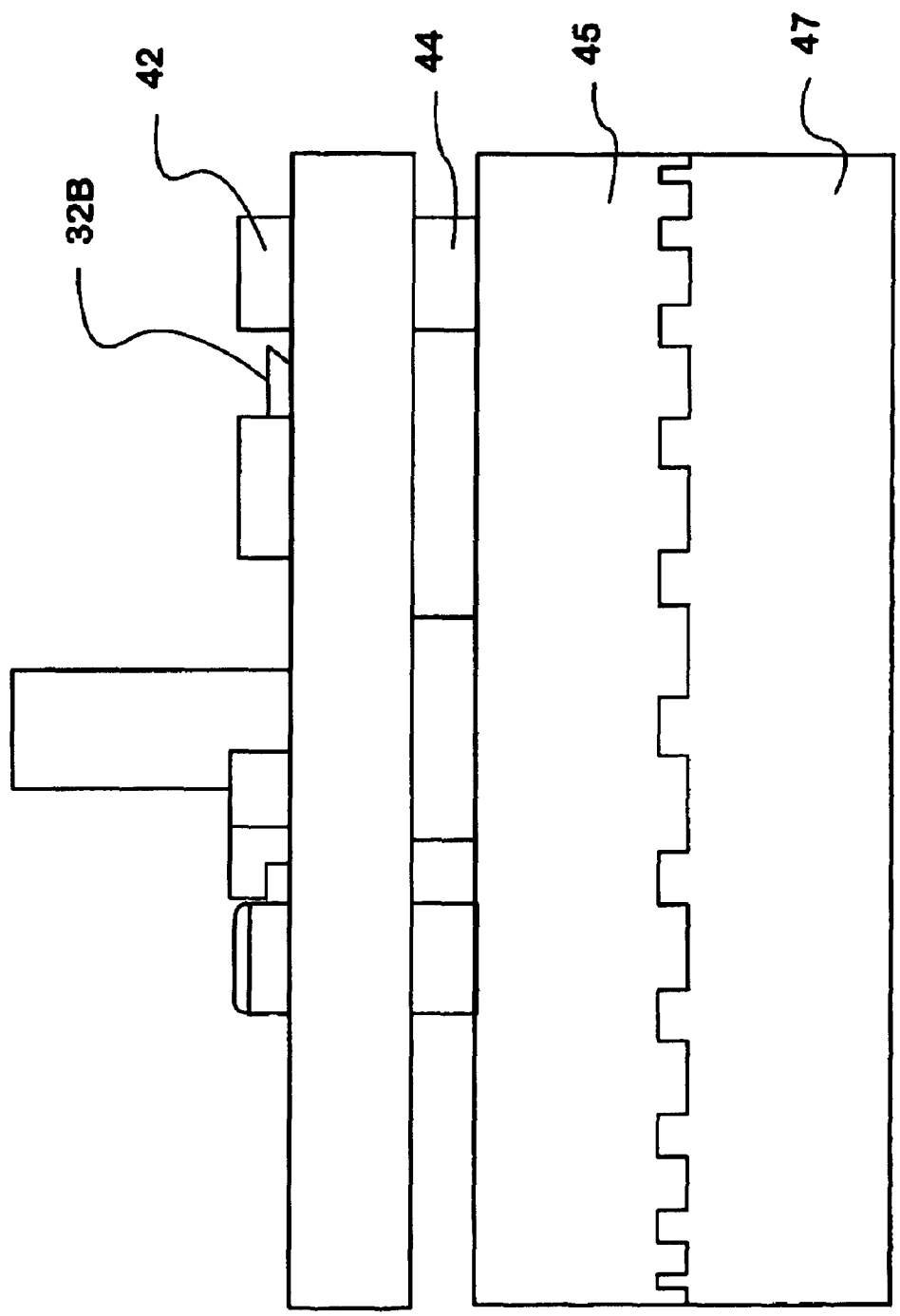
FIG. 6 is a side view of the park pawl feature of the transmission of the present invention illustrating operation of the invention.
Figure 7:
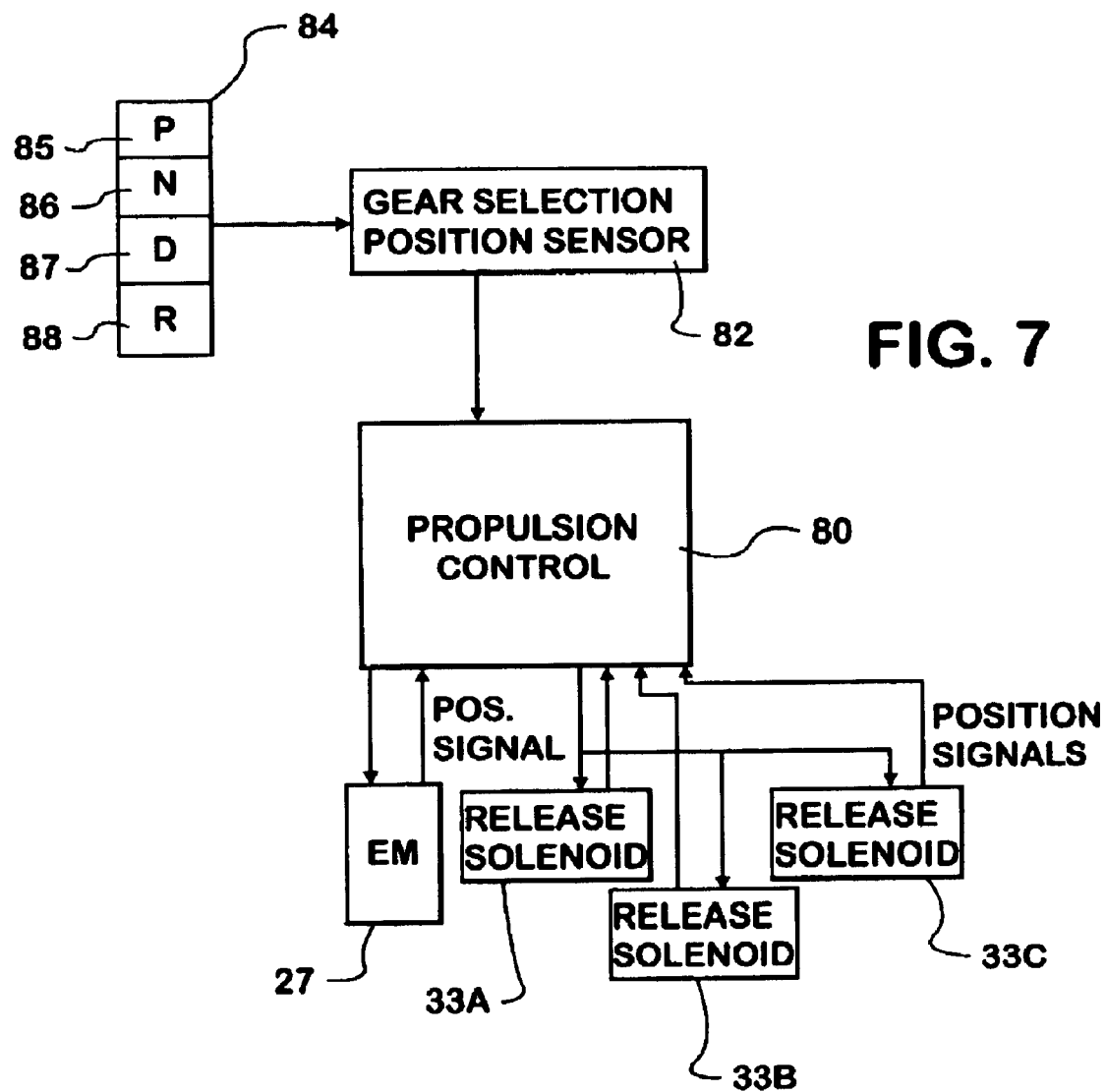
FIG. 7 is a schematic illustration of the control arrangements for the present invention.

Transmission 23 is operable when ring gear 47 and locking plate 45 are disengaged, as illustrated in FIGS. 2 and 5. Locking plate 45 is biased toward engagement with ring gear by a compression spring 52, positioned between electromagnet 47 and locking plate 45 and located partly in an annular indent 54 in a major face of locking plate 45. Electromagnet 27, when energized, operates to pull locking plate 45 into the disengaged, retracted position from a position in engagement with ring gear 47.

Continuous operation of electromagnet 27 to hold the locking plate 45 in the disengaged position would be both inefficient and would run a risk of power interruption to the electromagnet, resulting in unintended locking of the transmission. A secondary mechanical lock for holding locking plate 45 in a retracted position and avoiding continuous operation of the electromagnet 27 is provided. The secondary locking mechanism is implemented by providing retaining detent pins 32A, 32B and 32C located on the face 55 of electromagnet 27 away from locking plate 45 to engage guide pins 31A, 31B and 31C.

Guide pins 31A, 31B and 31C are modified to allow engagement by detent pins to prevent linear movement of the guide pins. Guide pins 31A, 31B and 31C each comprise a head 42 distal to the locking plate 45, a main stem 44 and a circumferential indent 41 located at the head's base wherein a detent pin may be inserted. The positions of the detent pins 32A, 32B and 32C are spring 37A–C biased toward engagement with the guide pins 31A, 31B and 31C. Solenoids 33A, 33B and 33C are provided for retracting detent pins 32A, 32B and 32C. With detent pins 32A, 32B and 32C retracted, and electromagnet 27 unenergized, spring 52 will urge locking plate 45 away from the electromagnet toward ring gear 27. When the ring gear 47 and locking plate 45 are properly aligned, the locking plate will move away from the electromagnet into engagement with the ring gear with the result that detents 41 are displaced into the body of electromagnet 27 and detent pins 32A–C impinge against heads 42 when solenoids 33A–C are disengaged. This allows the signal on the detent pin solenoids 33A, 33B and 33C to be released.

Engagement between ring gear 27 and locking plate 45 is preferably highly secure. One way of providing a secure engagement is to provide a plurality of cooperating straight milled slots 66 and 64 around the outer perimeters of opposed faces of the ring gear 27 and the locking plate 45. Such slots may be milled using a rotary table. With the locking plate 45 and ring gear 27 properly aligned, the space between slots on one face become teeth insertable in the slots of the second face and vice versa, allowing locking plate 45 to slip into engagement with ring gear 27 (shown in FIG. 6). If the cooperating slots 64 and 66 are not aligned when the park pawl is set, engagement does not immediately result, however, movement of vehicle 101 will result in rotation of ring gear 27 with the subsequent alignment of the slots. When locking plate 45 is retracted the teeth formed between slots 64 in locking plate 45 and the teeth formed between slots 66 in ring gear 27 should clear one another with minimal spacing.

Control of the park pawl of the invention is provided by a hybrid electric vehicle's propulsion control system 80. A gear selector 84 provides a park position 85, a neutral position 86, a drive position 87 and a reverse position 88. The park pawl is to be set only when gear selection is in park, as detected, and transmitted to propulsion control 80, by the gear selection position sensor 82. Selection of park from a different gear selection results in propulsion control transmitting an energization signal to electromagnet 27, and generation of a locking plate position signal by a position sensor, resulting in cancellation of the electromagnet energization signal. Propulsion control 80 may determine first that the vehicle is actually stationary. Such position signals may be indications of the position of one or more of the detent pins 32A, 32B or 32C. Movement of gear selection from park to any other position results in retraction energization signals being sent to release solenoids 33A, 33B 33C. The energization signals will be held until the position of the locking plate 45 is indicated to have changed, whereupon the detent pins 32A–C cannot return to a locking position.

The park pawl of the present invention provides secure locking of a transmission, even under shock loading. Repositioning of the pawl is provided using a simple combination of springs, solenoids and electromagnets, while retention of the pawl out of the way during operation of the vehicle is provided by a highly reliable and simple physical lock.

While the invention is shown in only one of its forms, it is not thus limited but is susceptible to various changes and modifications without departing from the spirit and scope of the invention.

What is claimed is:

1. A hybrid electric vehicle, comprising:

a chassis with two parallel side frame rails;

an engine mounted on the chassis;

an electric generator mounted to the chassis and coupled to be driven by the engine;

an electrical power system connected to receive power from the electric generator;

a drive motor mounted on the chassis train and coupled to the electrical power system to receive energization therefrom;

wheels depending from the chassis for supporting the vehicle on a surface;

a transmission including a rotatable element coupled to the drive motor;

a drive train coupling the rotatable element to a pair of the wheels;

the transmission further including a locking plate mounted for movement into and out of engagement with the rotable element to prevent rotation thereof;

the rotatable element is a ring gear;

the transmission comprising;

a plurality of slots around an outer perimeter of one face of the ring gear;

a plurality of cooperating teeth disposed on one face of the locking plate for engaging the plurality of slots;

means for urging the locking plate linearly into and out of engagement with the ring gear; and a gear case housing the ring gear and the locking plate;

an electromagnet plate positioned in the gear case housing behind the locking plate relative to the ring gear;

a plurality of guide pins affixed to a face of the locking plate, the guide pins being positioned to move into and out of openings in the electromagnetic plate to define a linear travel for the locking plate with respect to the ring gear;

a spring actuated catch for each guide pin located with respect to the electromagnetic plate for engaging its respective guide pin when the locking plate reaches a travel limit in the direction away from the ring gear; and a solenoid associated with each spring actuated catch for releasing the spring actuated catch from its respective pin.

2. A hybrid electric vehicle as set forth in claim 1, the transmission further comprising:

a spring located for urging the locking plate away from the electromagnet plate; and energization circuitry coupled to the electromagnetic plate for energizing the electromagnetic plate to pull the locking plate toward itself.

* * * * *